(12) United States Patent
Chen

(10) Patent No.: US 9,228,617 B2
(45) Date of Patent: Jan. 5, 2016

(54) DRIVE SHAFT STRUCTURE

(71) Applicant: FUJIAN HEZHONG MACHINERY CO., LTD., Fujian (CN)

(72) Inventor: Xuefu Chen, Jianyang (CN)

(73) Assignee: FUJIAN HEZHONG MACHINERY CO., LTD., Fujian (CN)

( * ) Notice: Subject to any disclaimer, the term of this patent is extended or adjusted under 35 U.S.C. 154(b) by 0 days.

(21) Appl. No.: 14/354,708

(22) PCT Filed: Dec. 19, 2012

(86) PCT No.: PCT/CN2012/086901
§ 371 (c)(1),
(2) Date: Apr. 28, 2014

(87) PCT Pub. No.: WO2013/117105
PCT Pub. Date: Aug. 15, 2013

(65) Prior Publication Data
US 2014/0326567 A1 Nov. 6, 2014

(30) Foreign Application Priority Data
Feb. 10, 2012 (CN) .......................... 2012 1 0029008

(51) Int. Cl.
*F16D 7/00* (2006.01)
*F16D 31/02* (2006.01)
*F16D 43/286* (2006.01)

(52) U.S. Cl.
CPC *F16D 7/00* (2013.01); *F16D 31/02* (2013.01); *F16D 43/286* (2013.01)

(58) Field of Classification Search
CPC .................................................. F16D 43/286
USPC ........................................................ 192/56.3
See application file for complete search history.

(56) References Cited

U.S. PATENT DOCUMENTS 1,751,496 A * 3/1930 Sandner ........................... 464/27
2,499,099 A * 2/1950 Kenyon ........................... 192/60
2,575,475 A * 11/1951 Stutzke ........................... 464/25

\* cited by examiner

*Primary Examiner* — Ramya Burgess
*Assistant Examiner* — Mark Manley
(74) *Attorney, Agent, or Firm* — Kratz, Quintos & Hanson, LLP

(57) ABSTRACT

The invention relates to a power transmission system of the automotive vehicle. A drive shaft structure, comprising a drive shaft and a hydraulic overload protector, the drive shaft comprises a first shaft and a coaxial second shaft, the hydraulic overload protector comprises a mounting rack, a crank shaft and at least a pair of hydraulic cylinders, a communicating tube is provided between two cylinders of the pair of hydraulic cylinders, a bi-directional pressure valve is provided on the communicating tube, said crank shaft comprises a spindle and a connecting rod shaft, said spindle is connected with said mounting rack rotatably, said first shaft is fixed with said mounting rack, said second shaft is fixed with said spindle, said connecting rod shaft is connected with said mounting rack via said cylinders. The invention discloses a drive shaft structure which can stop power transmission when the vehicle is overloaded, can restore power transmission automatically when the load meets the requirements and can buffer the resistance fluctuation during the driving process of the vehicle, the invention solves problems that the drive shaft will fracture when the vehicle is overloaded and when the resistance changes which increases the use cost and brings inconveniences to users.

17 Claims, 2 Drawing Sheets

DRIVE SHAFT STRUCTURE

FIELD OF THE INVENTION

The invention relates to the power transmission system of the automotive vehicle, in particular relates to a drive shaft structure and belongs to the automotive vehicle technical field.

BACKGROUND OF THE INVENTION

The motive power generated by the power equipment (engine or motor) of the automotive vehicle is transmitted to wheels via a power transmission system. The power driving mode of vehicles comprises three modes of front-wheel drive, rear-wheel drive and front-rear-wheel drive. The drive shaft is an indispensable component in the power transmission system no matter which drive mode is used.

In order to have enough driving force when vehicles drive on road surfaces with low adhesion coefficients, usually power transmission systems of vehicles are designed to be front wheel and rear wheel drive mode (namely front-rear-wheel drive mode). Especially trucks usually drive on road surfaces with bad road conditions, so the front-rear wheel drive mode is used mostly.

The power transmission path of front-rear-wheel drive vehicles is the power is transmitted to the transfer case, then the transfer case distributes the power into two part to output: one part is for the front drive shaft to drive the front axle, the front axle drives the front wheels via the front axle shaft; the other part is for the rear drive shaft to drive the rear axle, the rear axle drives the rear wheels via the rear axle shaft. For light-duty vehicles without independent suspension systems, the front axles are not designed, the front drive shafts drives the front wheels directly. For front-wheel drive or rear-wheel drive vehicles, the power is not transmitted to the drive shafts of wheels which do not participate in driving.

The transfer case is not designed in some vehicles, however a combinatory transmission is used to replace the transfer case to distribute the power. In China, the patent Front and Back Driving Force Output Structure of Automobile Tractor Without Independent Transfer Case with publication number of 101659211A and publication date of 3 Mar. 2010, discloses a driving force output structure of front-wheel and rear-wheel drive vehicles which replaces the transfer case with a combinatory transmission.

The drive shaft (a general term for front drive shaft, front axle shaft, rear drive shaft and rear axle shaft and so on) is designed to have corresponding load-carrying capability for vehicles with any power output structure, during the use process, if the load on the front wheel or rear wheel is greater than the set point, the corresponding drive shaft will be fractured to prevent overload which damages the front and rear axles, the transfer case, the engine and so on (as in the whole power output system, the cost of the drive shaft is the lowest and is convenient to be replaced, when one component has to be damaged, the drive shaft is the first choice). However, particularly in all-wheel-drive vehicles, when vehicles turn or drive on road surfaces having concave pits and the front wheels fall into the concave pits, the front wheels will have instantaneous impact, namely instantaneous overload which will cause fracture of the front drive shaft or the front axle shaft. Such instantaneous overload can not be avoided by the driver by controlling the load capacity the fracture of the front drive shall or the front axle shaft caused by instantaneous overload is also not needed by the designer or user, but a design disadvantage existing for a long time in the vehicle design; moreover, when the vehicle is overloaded, the design mode that a component has to be damaged (at present the damaged component is the drive shaft) is a technology bias existing for a long time in the power transmission system design of the vehicle, if the drive shaft is damaged in the open air, the expanse to send the vehicle to the repair factory or the labor cost and traveling expanse to ask maintenance men to repair is far more than the material cost of the drive shaft, therefore the design concept increases the use cost and bring great inconveniences to users; as the prior drive shaft is an integrated stiff shaft, when the resistance of the vehicle is changed, the resistance is reacted on the engine directly and causes unsteady of the engine load and poor stability of the engine, thus the fuel consumption is also increased, the principle is the same as when a driver which can not drive the vehicle steadily, the fuel consumption is high.

SUMMARY OF THE INVENTION

The invention discloses a drive shaft structure which can stop power transmission when the vehicle is overloaded, can recover power transmission automatically when the load meets the requirements and can buffer the resistance fluctuation during the driving process of the vehicle, the invention solves problems that the drive shaft will fracture when the vehicle is overloaded which increases the use cost of the vehicle and brings inconveniences to users, and problems of load fluctuation and fuel consumption increase of the engine when the resistance is changed and reacted on the engine.

Above-mentioned technical problems are solved by technical proposals as follows: A drive shaft structure is provided, comprising a drive shaft and a hydraulic overload protector, said drive shaft comprises a first shaft and a coaxial second shaft, said hydraulic overload protector comprises a mounting rack, a crank shaft and at least a pair of hydraulic cylinders, said hydraulic cylinder comprises a cylinder body and a piston rod, a communicating tube is provided between two cylinders of the pair of hydraulic cylinders, a bi-directional pressure valve is provided on the communicating tube, said crank shaft comprises a spindle and a connecting rod shaft, said spindle is connected with said mounting rack rotatably, said first shaft his fixed with said mounting rack, said second shaft is fixed with said spindle, said connecting rod shaft is connected with said mounting rack via said cylinders. The Bi-directional Pressure Valve refers to a valve which opens toward the side with lower pressure when the pressure difference of two sides of the valve core reaches the preset value. During the use process, the motive power is input from one of the first shaft and the second shaft and is output from the other one; as the crank shaft is fixed on the mounting rack via the pair-arranged hydraulic cylinders, when the torsion between the first shaft and the second shaft reaches the torsion to open the bi-directional pressure valve, the crank shaft will rotate relative to the mounting rack, namely the first shaft can rotate relative to the second shaft, when the torsion between the first shaft and the second shaft is restored to be lower than the open pressure of the bi-directional pressure valve, the relative rotation between the crank shaft and the mounting rack is stopped, namely the synchronous rotation between the first shaft and the second shaft is restored so as to prevent the drive shaft from being fractured when the resistance is too large and buffer the resistance in the driving process, therefore the resistance, has a small influences to the stability of the engine, load, the engine has a good stability when it works, thus the fuel consumption is reduced.

Preferably, said cylinder is fixed on said mounting rack, said piston rod is connected with said connecting rod shaft via the connecting rod.

Preferably, moreover said cylinder is hinged on said mounting rack, said connecting rod shaft is connected on said piston rod rotatably. The appearance size of the overload protector can be quite small.

Preferably, said mounting rack comprises a left supporting seat, a right supporting seat and a connecting frame for connecting the left supporting seat with the right supporting seat, the left supporting seat, the right supporting seat and the connecting frame form a frame structure, said crank shaft and hydraulic cylinders are located in said mounting rack, said spindle comprises a left main journal and a right main journal, the left main journal is rotatably connected on the left supporting seat, the first shaft is fixed on the left supporting seat, the right main journal is rotatably connected on the right supporting seat, the second shaft is fixed with the right main journal. Both ends of the cranks shaft are connected on the mounting rack rotatably, thus the crank shaft is convenient to be fixed, the stability is good when relative rotation occurs between the crank shaft and the mounting rack; the hydraulic cylinders are designed to locate in the mounting rack, thus the hydraulic cylinder are not easy to be damaged and the reliability of the invention is enhanced.

Preferably, the left main journal is rotatably connected on the left supporting seat via a bearing, the right main journal is rotatably connected on the right supporting seat via a hearing. The joint part between the crank shaft and the mounting rack is not easy to be abraded, the resistance between the crank shaft and the mounting rack is small, such resistance has small influence when the invention works, therefore the invention has good reliability and safety.

Preferably, two pairs of said hydraulic cylinders are provided. By doing this, the crank shaft and the mounting rack can be fixed together more steadily.

Preferably, two hydraulic cylinders of each pair of hydraulic cylinders are located on the same straight line, two straight lines on which the two pair of hydraulic cylinders are located are perpendicular. Therefore the hydraulic cylinders have good effect of torque transfer between the crank shaft and the mounting rack.

Preferably, said bi-directional pressure valve comprises a valve body and a valve core located in the valve body, two valve ports are provided on said valve body, a straight section which can be connected with said valve core slidably and hermetically is provided in said valve body, said straight section and valve core are located between said two valve ports, both sides of said valve core are connected with said valve body via springs. During the use process, when the pressure difference of both sides of the valve core is greater than the elastic force of the spring and pushes the valve core away from the straight section, the two valve ports are connected, the liquid in the hydraulic cylinders flows to the side with lower pressure from the side with high pressure. The elastic force of the spring enables the valve core to move forward to the straight section, when the pressure difference can not overcome the elastic force of the spring and the valve core leaves the straight section (namely the pressure difference is smaller than the open value), the valve core is located in the straight section and is connected with the straight section hermitically, the liquid in the two hydraulic cylinders can not be connected.

Preferably, the distance between said spindle and said connecting rod shaft is equal to or greater than 3 cm. The hydraulic cylinders enables the crank shaft to rotate with the mounting rack with a small force. In this way, the open force of the bi-directional valve can be designed to be quite small, drive shafts which transmit small torsion also can use the structure of the invention.

Advantages of the invention comprise: As the drive shaft is designed to comprise a first shaft and a second shaft and the two shafts are driven via a hydraulic overload protector, the force transmission will stop when the vehicle is overloaded and transmission power can be restored automatically when the vehicle is not overloaded, therefore components of the drive system of the vehicle are prevented from being damaged, the use cost of the vehicle is reduced and conveniences for users are enhanced; the hydraulic protector can buffer the resistance in the driving process, thus the resistance to the stability of the engine load is small, the engines has a good stability when it works, and the fuel consumption in the drive process of the vehicle is reduced.

DETAIL DESCRIPTION OF FIGURES

Figure 1:
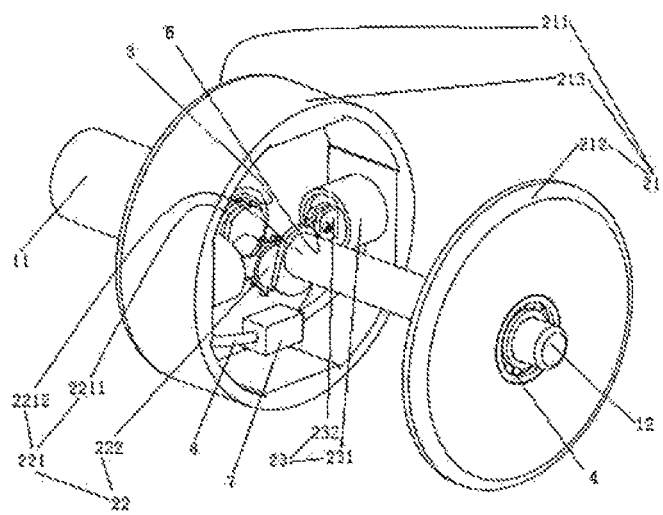
FIG. 1 is a schematic diagram of the solid structure of Example 1 in the invention when the right supporting seat is open.

In the figures: first shaft 11, second shaft 12, mounting rack 21, left supporting seat 211, right supporting seat 212, connecting frame 213, crank shaft 22, spindle 221, left main journal 2211, right main journal 2212, connecting rod shaft 222, hydraulic cylinder 23, cylinder rod 231, piston rod 232, left axial bearing 3, right axial hearing 4, connecting rod 5, connecting tube 6, bi-directional pressure valve 7, valve body 71, valve core 72, first valve port 73, second valve port 74, straight section 75, close spring 76.

PREFERRED EMBODIMENTS OF THE INVENTION

The invention is further described in detail with combination of figures.

As shown in FIG. 1, the invention relates to a drive shaft structure, comprising a drive shaft and a hydraulic overload protector.

The drive shaft comprises a first shaft 11 and a second shaft 12. The first shaft 11 and the second shaft 12 are coaxial.

The hydraulic overload protector comprises a mounting rack 21, a crank shaft 22 and a pair of hydraulic cylinders 23.

The mounting rack 21 comprises a left supporting seat 211, a right supporting seat 212 and a connecting frame 213 which connects the left supporting seat 211 with the right supporting seat 212. The left supporting seat 211, the right supporting seat 212 and the connecting frame 213 form a frame structure. The crank shaft 22 and the hydraulic cylinder 23 are located in the mounting rack 21.

The crank 22 comprises a spindle 221 and a connecting rod shaft 222. The spindle 221 comprises a left main journal 2211 and a right mail journal 2212. The distance between the spindle 221 and the connecting rod shaft 222 is 3 cm.

The hydraulic cylinder 23 comprises a cylinder body 231 and a piston rod 232.

The right end of the first shaft 11 is welded with the left supporting seat 211. The left main journal 2211 is rotatably connected on the left supporting seat 211. A left axial bearing 3 is provided between the left main journal 2211 and the left supporting seat 211. The right main journal 2212 is rotatably connected on the right supporting seat 212. A right axial bearing 4 is provided between the right main journal 2212 and the right supporting seat 212. The right main journal 2212 is integrated and coaxial with the second shaft 12.

Two hydraulic cylinders 23 of the pair of hydraulic cylinders are arranged in opposite direction. Two hydraulic cylinders 23 of the pair of hydraulic cylinders are located in the same straight line. The cylinder body 231 is fixed on the connecting frame 213. The piston rod 232 is connected with the connecting rod shaft 222 via the connecting rod 5. A connecting tube 6 is provided between the two cylinder bodies 231 of the pair of hydraulic cylinders 23. A bi-directional valve 7 is arranged on the connecting tube 6.

Figure 2:
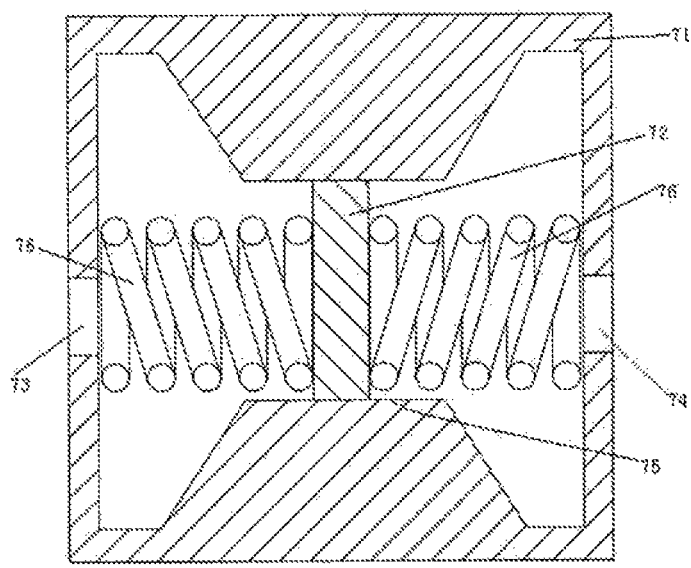
FIG. 2 is a section view of the hi-directional pressure valve in the invention.

As shown in FIG. 2, the bi-directional pressure valve comprises a valve body 71 and a valve core 72 located in the valve body 71. A first valve port 73, a second valve port 74 and a straight section 75 are provided on the valve body 71. The straight section 75 and the valve core 72 are all located between the first valve port 73 and the second valve port 74. The left and right sides of the valve core 72 are connected with the valve body 71 via a spring 76 respectively.

As shown in FIG. 2 and with combination of FIG. 1, the working process of the bi-directional pressure valve in the example is: During the use process, the first valve port 73 and the second valve port 74 are connected with the two cylinder bodies 231 of the same pair of hydraulic cylinders via the connecting tube 6 respectively. When the pressure of the left side of the valve core is greater than the pressure of the right side, and the pressure difference is as great as enough to overcome the elastic force of the spring 76 to enable the valve core 72 to move right away from the straight section 75, the valve opens towards right; conversely, when the pressure of the right side of the valve core 72 is greater than the pressure of the left side, and the pressure difference is great enough to overcome the elastic force of the spring 76 to enable to valve core 72 to move left away from the straight section 75, the valve opens toward left. If the valve core 72 is located in the straight section 75, as the valve core 72 is connected with the straight section 75 hermitically, the left and right sides of the valve core 72 are separated, namely the bi-directional pressure valve is closed.

As shown in FIG. 1, the course of action of the invention is described as follows by taking that the first shaft inputs power and the second shaft outputs power as an example (it also works by taking that the second shaft inputs power and the first shaft output power as an example): when the first shaft receives the input power and rotates, the first shaft 11 drives the mounting rack 21 to rotate synchronously, the mounting rack drives the hydraulic cylinders 23 to rotate synchronously; the hydraulic cylinders 23 drives the crank shaft 22 to rotate via the connecting rod 5, the crank shaft 22 drives the second shaft to rotate synchronously, the second shaft 12 drives the load. During the work process, the crank shaft 22 has a compression trend to one hydraulic cylinder of the pair of hydraulic cylinders 23 and has a pull trend to another hydraulic cylinder so as to generate a pressure difference on both ends of the bi-directional valve 7, when the resistance on the second shaft 12 increases (the load increases relatively), the pressure difference will also increase relatively, when the pressure difference increases enough great to open the bi-directional valve 7, the bi-directional valve 7 will open, the result of open is that the crank shaft 22 rotates relative to the mounting rack 21 (namely rotative speed difference exists between the two). Once the pressure difference can not enable the bi-directional pressure valve 7 to open, the bi-directional pressure valve 7 is closed, when the bi-directional pressure valve is closed, the first shaft 11 and the second shaft 12 rotate synchronously. Thus when the vehicle is overloaded, the drive shaft will not be damaged and the former transmission components also will not be damaged so as to play a role a overload protection, the first shaft 11 can rotate in accordance with the set output of the engine, the change of load has small influence to the run of the engine, thus the fuel consumption is reduced.

Figure 3:
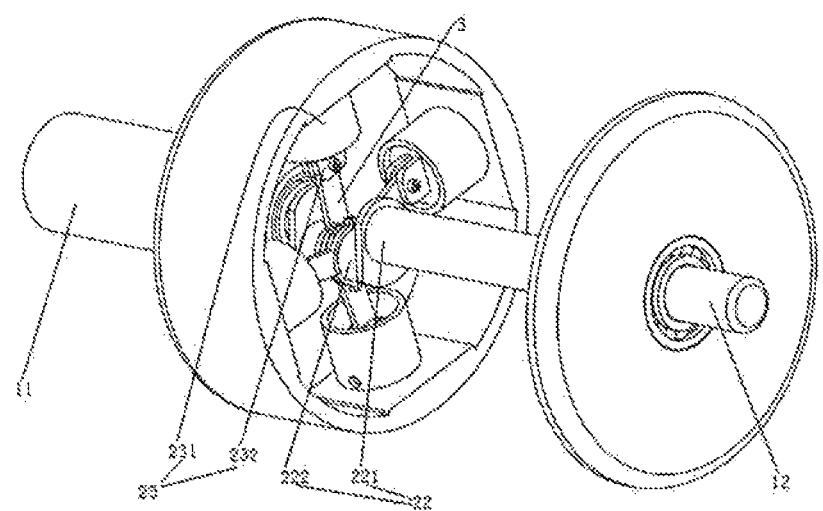
FIG. 3 is a schematic diagram of the solid structure of Example 2 when the right supporting seat is open, connecting tubes and bi-directional hydraulic valve are omitted in the figure.

Example 2, as shown in FIG. 3, the differences from Example 1 are: a pair of hydraulic cylinders 23 are provided. Two hydraulic cylinders 23 of each pair of hydraulic cylinders are located on the same straight line, two straight lines on which the two pair of hydraulic cylinders are located are perpendicular. The same as the way in Example 1, cylinder bodies 231 of the two hydraulic cylinders of each pair of the hydraulic cylinders 23 are connected via a connecting tube 6 (omitted in the figure), a bi-directional hydraulic valve 7 is provided on the connecting tube 6 (omitted in the figure). The distance between the spindle 221 and the connecting rod shaft 222 is 5 cm.

Figure 4:
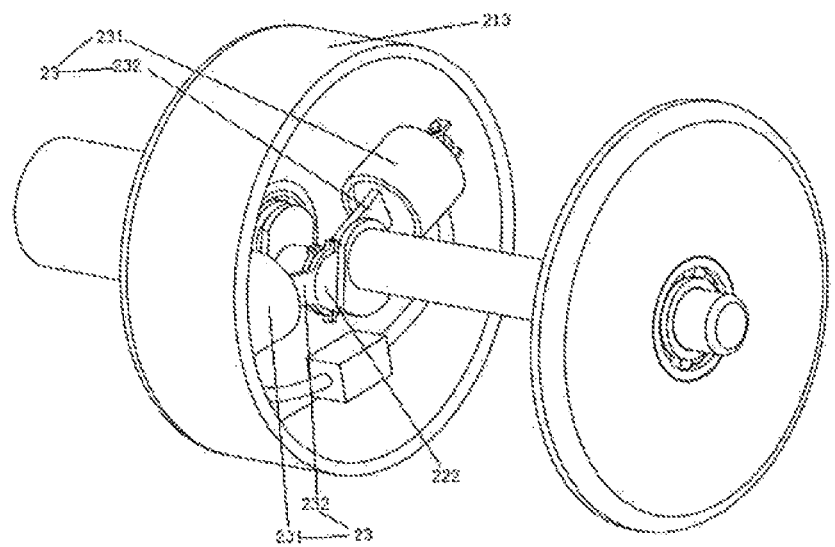
FIG. 4 is a schematic diagram of the solid structure of Example 1 in the invention when the right supporting seat is open.

Example 3, as shown in FIG. 4, the differences from Example 1 are the connecting rod shaft 222 is directly connected on two piston rods 232 rotatably at the same time. The two cylinder bodies 232 are all hinged on the internal surface of the connecting frame 213.

The invention claimed is:

1. A drive shaft structure, comprising a drive shaft, wherein the drive shaft further comprising a hydraulic overload protector, said drive shaft comprising a first shaft and a coaxial second shaft, said hydraulic overload protector comprising a mounting rack, a crank shaft and at least a pair of hydraulic cylinders, a communicating tube being provided between two cylinders of the pair of hydraulic cylinders, a bi-directional pressure valve being provided on the communicating tube, said crank shaft comprising a spindle and a connecting rod shaft, said spindle being connected with said mounting rack rotatably, said first shaft being fixed with said mounting rack, said second shaft being fixed with said spindle, said connecting rod shaft being connected with said mounting rack via said cylinder.

2. The drive shaft structure according to claim 1, wherein said hydraulic cylinder comprises a cylinder and a piston rod, said cylinder is fixed on said mounting rack, said piston rod is connected with said connecting rod shaft via the connecting rod.

3. The drive shaft structure according to claim 1, wherein said hydraulic cylinder comprises a cylinder and a piston rod, said cylinder is hinged on said mounting rack, said connecting rod shaft is connected on said piston rod rotatably.

4. The drive shaft structure according to claim 1, wherein said mounting rack comprises a left supporting seat, a right supporting seat and a connecting frame for connecting the left supporting seat with the right supporting seat, the left supporting seat, the right supporting seat and the connecting frame form a frame structure, said crank shaft and hydraulic cylinders are located in said mounting rack, said spindle comprises a left main journal and a right main journal, the left main journal is rotatably connected on the left supporting seat, the first shaft is fixed on the left supporting seat, the right main journal is rotatably connected on the right supporting seat, the second shaft is fixed with the right main journal.

5. The drive shaft structure according to claim 4, wherein the left main journal is rotatably connected on the left supporting seat via a bearing, the right main journal is rotatably connected on the right supporting seat via a bearing.

6. The drive shaft structure according to claim 1, wherein two pairs of said hydraulic cylinders are provided.

7. The drive shaft according to claim 6, wherein two hydraulic cylinders of each pair of hydraulic cylinders are located on the same straight line, two straight lines on which the two pair of hydraulic cylinders are located are perpendicular.

8. The drive shaft structure according to claim 1, wherein said bi-directional pressure valve comprises a valve body and a valve core located in the valve body, two valve ports are provided on said valve body, a straight section which can be connected with said valve core slidably and hermetically is provided in said valve body, said straight section and valve core are located between said two valve ports, both sides of said valve core are connected with said valve body via springs.

9. The drive shaft structure according to claim 1, wherein the distance between said spindle and said connecting rod shaft is equal to or greater than 3 cm.

10. The drive shaft structure according to claim 2, wherein said mounting rack comprises a left supporting seat, a right supporting seat and a connecting frame for connecting the left supporting seat with the right supporting seat, the left supporting seat, the right supporting seat and the connecting frame form a frame structure, said crank shaft and hydraulic cylinders are located in said mounting rack, said spindle comprises a left main journal and a right main journal, the left main journal is rotatably connected on the left supporting seat, the first shaft is fixed on the left supporting seat, the right main journal is rotatably connected on the right supporting seat, the second shaft is fixed with the right main journal.

11. The drive shaft structure according to claim 3, wherein said mounting rack comprises a left supporting seat, a right supporting seat and a connecting frame for connecting the left supporting seat with the right supporting seat, the left supporting seat, the right supporting seat and the connecting frame form a frame structure, said crank shaft and hydraulic cylinders are located in said mounting rack, said spindle comprises a left main journal and a right main journal, the left main journal is rotatably connected on the left supporting seat, the first shaft is fixed on the left supporting seat, the right main journal is rotatably connected on the right supporting seat, the second shaft is fixed with the right main journal.

12. The drive shaft structure according to claim 2, wherein two pairs of said hydraulic cylinders are provided.

13. The drive shaft structure according to claim 3, wherein two pairs of said hydraulic cylinders are provided.

14. The drive shaft structure according to claim 2, wherein said bi-directional pressure valve comprises a valve body and a valve core located in the valve body, two valve ports are provided on said valve body, a straight section which can be connected with said valve core slidably and hermetically is provided in said valve body, said straight section and valve core are located between said two valve ports, both sides of said valve core are connected with said valve body via springs.

15. The drive shaft structure according to claim 3, wherein said bi-directional pressure valve comprises a valve body and a valve core located in the valve body, two valve ports are provided on said valve body, a straight section which can be connected with said valve core slidably and hermetically is provided in said valve body, said straight section and valve core are located between said two valve ports, both sides of said valve core are connected with said valve body via springs.

16. The drive shaft structure according to claim 2, wherein the distance between said spindle and said connecting rod shaft is equal to or greater than 3 cm.

17. The drive shaft structure according to claim 3, wherein the distance between said spindle and said connecting rod shaft is equal to or greater than 3 cm.

* * * * *